United States Patent
Gangawere

[15] 3,684,915
[45] Aug. 15, 1972

[54] RECTANGULAR TO POLAR DISPLAY CONVERTER

[72] Inventor: Lloyd B. Gangawere, Ellicott City, Md.

[73] Assignee: Westinghouse Electric Corporation, Pittsburgh, Pa.

[22] Filed: June 15, 1970

[21] Appl. No.: 46,379

[52] U.S. Cl. .................... 315/23, 315/24, 343/11
[51] Int. Cl. ................................ H01j 29/70
[58] Field of Search ........................... 315/23, 24

[56] References Cited

UNITED STATES PATENTS 2,677,785  5/1954  Owen .................... 315/24
2,860,284  11/1958  McKim .................... 315/24

Primary Examiner—Benjamin A. Borchelt
Assistant Examiner—S. C. Buczinski
Attorney—F. H. Henson, E. P. Klipfel and J. L. Wiegreffe

[57] ABSTRACT

Apparatus for converting a display for a CRT tube from rectangular coordinates to polar coordinates for radar and the like applications whereby the same CRT tube can be used to display television pictures or to produce a sector-scan PPI radar display while utilizing all elements of a scan converter memory in producing the PPI display.

3 Claims, 3 Drawing Figures

RECTANGULAR TO POLAR DISPLAY CONVERTER

BACKGROUND OF THE INVENTION

As is known, the usual television receiver tube employs scanning of an electron beam in rectangular coordinates (i.e., along X and Y axes). The electron beam is caused to scan the face of the tube back and forth along a horizontal line at one scanning frequency; while the beam is also caused to move in the vertical direction at a much lower scanning frequency. In this manner, the back and forth horizontal scanning lines are caused to move in a vertical direction until the entire face of the tube is scanned; whereupon the process is repeated.

Scanning in rectangular coordinates can be used to produce a B-type radar display wherein the field of view is rectangular and the azimuth of the target is determined by the position of a bright spot to the right or left of the center of the display. Range is determined in a B-type scan by the position of the bright spot with respect to the bottom of the display. In certain cases, however, it is desired to utilize a PPI radar display which plots range and azimuth in polar coordinates. In sector-scan techniques utilizing a PPI display, the antenna is caused to rotate back and forth through an arc of, say, 90° so that searching is accomplished in a horizontal plane. The beam is usually narrow in azimuth and broad in elevation; and a large number of pulses are transmitted as the antenna rotates through its predetermined arc. As each pulse is transmitted, an unintensified spot starts from the center of the indicator and moves toward the edge along a radial line. Upon reaching the edge of the indicator, the spot quickly jumps back to the center and begins another trace as soon as the next pulse is transmitted.

As the antenna rotates, the straight-line path of the spot rotates about a center of rotation such that the angle of the radial line, on which the spot appears, indicates the azimuth of the target and the distance out from the center of the indicator indicates the range of the target.

In certain cases, it is desired to provide a radar display and a television picture on the same tube face whereby a televised picture of a target can be viewed on the tube alternately with a radar display of the target on this same tube. In systems of this type, it is necessary to store information regarding the range and azimuth of the target in a memory bank. If the radar display is of the B-type, it is relatively easy to utilize the information in the memory bank to provide the B-type display since the television tube ordinarily scans in rectangular coordinates. However, when it is desired to provide a PPI radar display, utilizing the range and azimuth information stored in a memory bank, the problem becomes exceedingly more difficult.

SUMMARY OF THE INVENTION

In accordance with the present invention, information in rectangular coordinates stored in a memory bank regarding the range and azimuth of a radar target is displayed on the screen of a conventional television tube in a sector-scan PPI arrangement while utilizing all of the memory elements of the memory bank to achieve high resolution, meaning that the maximum azimuth angle near the apex of the PPI display will be the same as that at ranges far removed from the apex. This is accomplished by initially producing a sine wave whose amplitude increases as the vertical sweep sawtooth waveform for the CRT tube, utilized as a television receiver, increases in amplitude. By separating this sine wave into components displaced in phase with respect to each other by 90° and by applying portions of the phase-displayed signals to the vertical and horizontal deflection elements of the CRT tube in sequence, the electron beam of the CRT tube can be made to sweep through arcs of a circle which progressively increase in length and radius from a center point. Furthermore, by shifting the center point of the array downwardly toward the bottom of the CRT tube, the size and viewability of the PPI display can be maximized.

As the vertical sweep sawtooth waveform increase in amplitude, so also will the amplitude of the aforesaid phase-displaced sine wave. In this process, the electron beam, which is scanning through successive arcs of greater and greater radii, moves upwardly on the screen of the CRT tube; while the PPI sector-scan spreads out. At the same time, movement of the electron beam is synchronized with the horizontal sync pulses for the CRT tube, and these same sync pulses are applied to the memory bank such that information regarding the azimuth of the target will be displayed regardless of the length of the arc through which the electron beam scans.

The above and other objects and features of the invention will become apparent from the following detailed description taken in connection with the accompanying drawings which form a part of this specification and in which.

Figure 1:
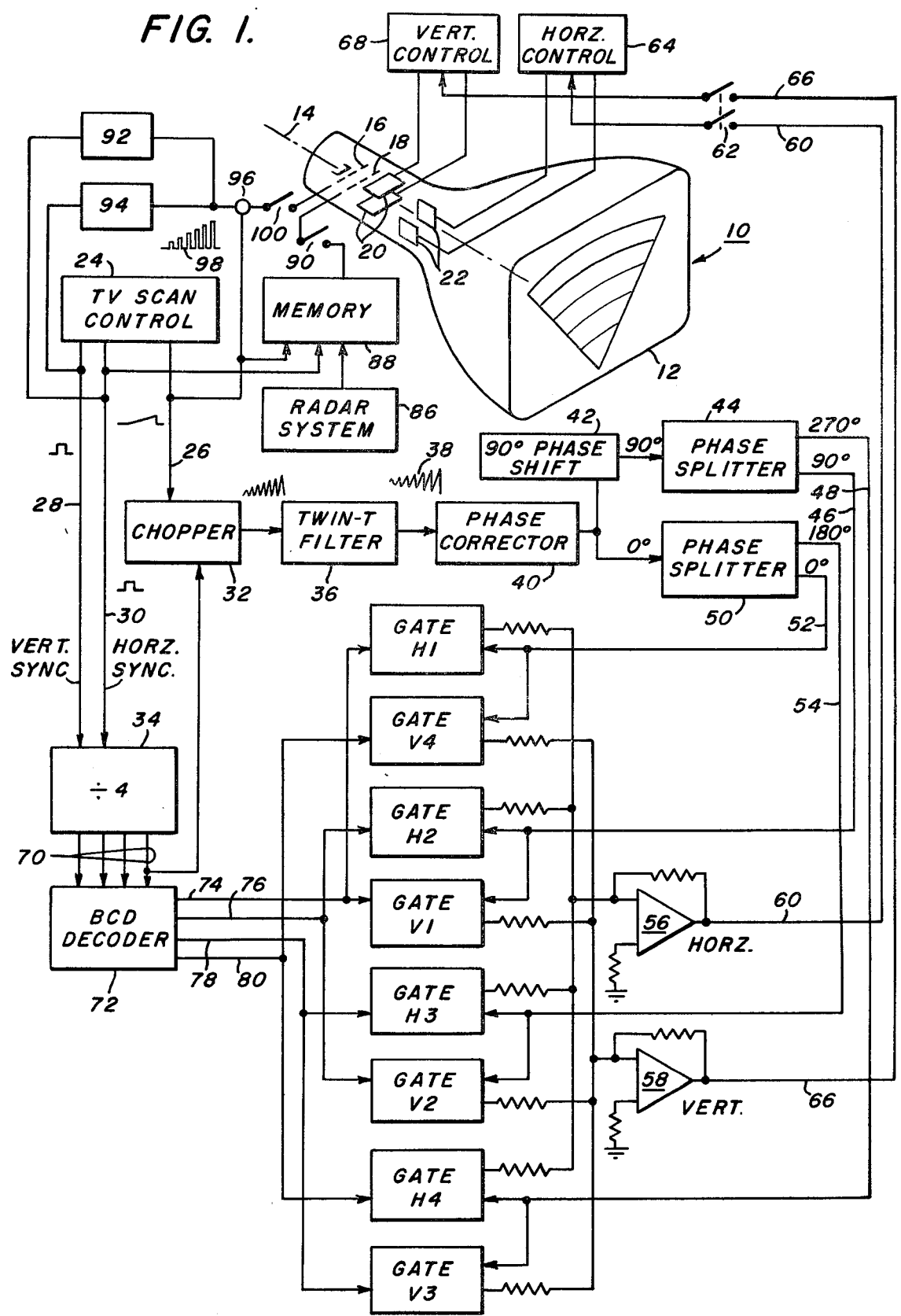
FIG. 1 is a schematic circuit diagram of one illustrative embodiment of the invention.

With reference now to the drawings, and particularly to FIG. 1, the apparatus shown includes a conventional television CRT receiving tube 10 having a forward phosphor-covered face 12, a cathode 14, control grids 16 and 18 and a suitable anode, not shown. An electron emitted by the cathode 14 passes through the grids 16 and 18 and between vertical deflection plates 20 and horizontal deflection plates 22 before impinging upon the phosphor-covered face 12.

The tube 10 is provided with the usual television scan control circuitry 24 which, among other things, produces a sawtooth waveform on lead 26 comprising the vertical sweep signal which is normally applied to the vertical deflection plates 20 by suitable means, not shown. This sawtooth waveform causes the electron beam to move vertically along the face of the tube from the bottom to the top, for example, in presenting a picture of the face of the tube. The TV scan control circuit also produces on lead 28 vertical sync pulses and on lead 30 horizontal sync pulses. When a picture is displayed on the face of the tube 10, the horizontal sync pulses cause the electron beam to move horizontally across the face of the tube, these pulses being utilized to generate a horizontal sawtooth waveform applied to the horizontal deflection plates 22 at a much higher frequency than the vertical sawtooth waveform.

As shown in FIG. 1, the vertical sweep waveform on lead 26 is applied to a chopper 32 where it is chopped at a rate equal to one-quarter the horizontal sync pulse rate (i.e., one-quarter the horizontal scanning frequency). The chopping pulses for chopper 32 are derived from a divider or counter 34 to which the horizontal sync pulses on lead 30 are applied. The vertical sync pulses on lead 28 are utilized to reset the counter 34.

From the chopper 32, the chopped sawtooth waveform is passed through a twin-T filter 36 to produce a sine wave output, identified by the reference numeral 38 in FIG. 1. This sine wave progressively increases in amplitude, beginning with the initiation of the sawtooth waveform. The waveform 38, in turn, is applied through a phase corrector 40, one purpose of which is to shift the location of the axis or apex of the PPI display on the tube 10 as will hereinafter be explained.

The output of the phase corrector 40 is applied through a 90° phase shift circuit 42 to a phase splitter 44 which produces signals on leads 46 and 48 which are displaced in phase with respect to the original signal at the output of the phase corrector 40 by 90° and 270°, respectively. Similarly, the output of the phase corrector 40 is applied directly to a second phase splitter 50 which produces, on leads 52 and 54, a signal which is in phase with the input signal and one which is displaced in phase 180° with respect to the input signal. The signal on lead 52 which has not been shifted in phase is applied to two gates H1 and V4. Similarly the signal on lead 46 which has been shifted in phase by 90° is applied to gate circuits H2 and V1. The signal on lead 54 which has been shifted in phase by 180° is applied to gate circuits H3 and V2; and the signal on lead 48 which has been shifted in phase by 270° is applied to gate circuits H4 and V3. As will be seen, these gate circuits are gated on in sequence so as to apply, through horizontal summing amplifier 56 and vertical output summing amplifier 58, portions of the applied waveforms which are displaced in phase with respect to each other by 90°.

The output of horizontal summing amplifier is connected through lead 60 and switch 64 to a horizontal deflection plate control circuit 64 which, in turn, is connected to the horizontal deflection plates 22. Similarly, the output of the vertical summing amplifier 58 is applied through lead 66 and switch 62 to a vertical control circuit 68 connected to the vertical deflection plates 20. It should be understood, however, that instead of using electrostatic deflection plates such as those shown in FIG. 1, electromagnetic deflection coils can be used equally as well.

In the output of the counter 34 comprising binary bits on leads 70 are also applied to a binary coded decimal decoder 72 which produces, on leads 74–80, sequential pulses. With this arrangement, a pulse will appear on each one of the leads 74–80 in sequence during each cycle of the waveform applied to the gate circuits from the phase splitters 44 and 50. The pulses on lead 74 are applied as shown to gate circuits H1 and V1; those on lead 76 are applied to gate circuits H2 and V2; those on lead 78 are applied to gate circuits H3 and V3; and those on lead 80 are applied to gate circuits H4 and V4.

Figure 2:
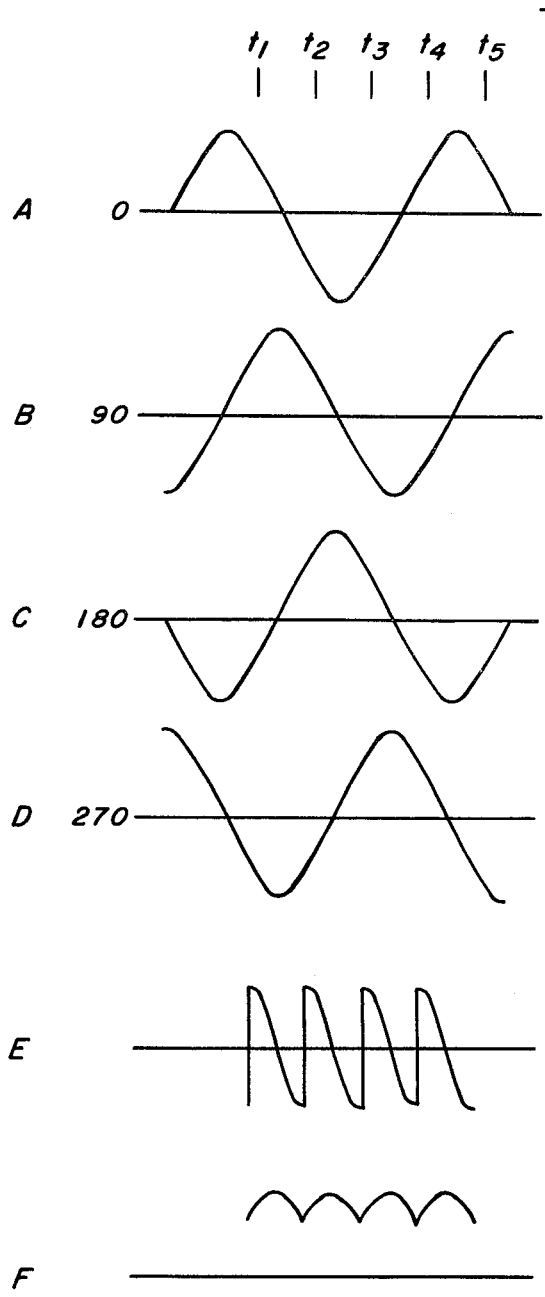
FIG. 2 comprises waveforms illustrating the operation of the circuit of FIG. 1.

The operation of the system can best be understood by reference to FIG. 2 wherein the waveforms A, B, C and D represent the sine waves at the output of the phase splitters 44 and 50 which are shifted 0°, 90°, 180° and 270°, respectively, with respect to the output of the phase corrector 40. It will be assumed that a pulse is produced on lead 74 between times $t_1$ and $t_2$, that a pulse is produced on lead 76 between times $t_2$ and $t_3$, that a pulse is produced on lead 78 between times $t_3$ and $t_4$, and that a pulse is produced on lead 80 between times $t_4$ and $t_5$.

When the pulse on lead 74 occurs between times $t_1$ and $t_2$, gates H1 and V1 are enabled. Gate H1, which is connected to the horizontal summing amplifier 56, has waveform A applied thereto. Consequently, the output of amplifier 56 will appear as waveform E which comprises a portion of the waveform A between times $t_1$ and $t_2$. At the same time, the gate V1 has applied thereto the signal on lead 46 which is shifted in phase by 90°, or waveform B shown in FIG. 2. Consequently, the output of the summing amplifier 58 between times $t_1$ and $t_2$ will appear as a portion of waveform B between times $t_1$ and $t_2$, which is the positive peak of the sine wave.

Between times $t_2$ and $t_3$, a pulse will appear on lead 76 which enables gates H2 and V2. Gate H2 has applied thereto waveform B which is shifted in phase by 90°; and gate V2 has applied thereto waveform C which is shifted in phase by 180°. Consequently, the output of horizontal amplifier 56 between times $t_2$ and $t_3$ will be the portion of waveform B between times $t_2$ and $t_3$. Similarly, the output of vertical summing amplifier 58 will be the portion of waveform C between times $t_2$ and $t_3$ or, again, the positive peak of waveform C.

Between times $t_3$ and $t_4$ a pulse appears on lead 78 to enable gates H3 and V3 which have waveforms C and D, shifted in phase by 180° and 270°, respectively, applied thereto. Consequently, waveforms E and F repeat between times $t_3$ and $t_4$; and will also repeat when a pulse on lead 80 between times $t_4$ and $t_5$ enables gates V4 and H4.

Figure 3:
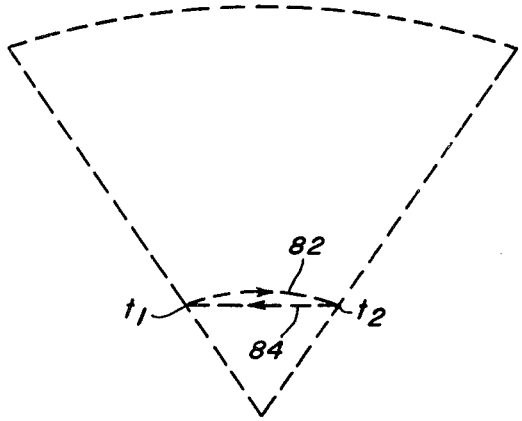
FIG. 3 shows the manner in which the electron beam scans back and forth.

The present system is based upon the fact that a circle can be generated on the face of a CRT tube by the application of two sine waves, phase shifted with respect to each other by 90°, to the horizontal and vertical deflection plates of the CRT tube. Waveforms E and F which are applied to the vertical and horizontal deflection plates 20 and 22 satisfy this requirement for the generation of a circle. However, it will be noted that one-quarter of a sine wave repeats rather than full sine wave. Consequently, and as shown in FIG. 3, the path of the electron beam is as shown by the dotted line 82. Assume that at time $t_1$, the electron beam begins to move from left to right by virtue of the fact that the waveform E, applied to the horizontal deflection plates 22, decreases from a positive value through zero and then to a negative value, causing the electron beam to sweep from left to right until time $t_2$ is reached. During this time, the waveform F, applied to the vertical deflection plates 20, increases in the positive direction and then decreases, thereby producing the arc configuration of trace 82. At time $t_2$, the voltage of waveform E jumps back to its original positive value, causing the electron beam to retrace along the path 84 as shown in FIG. 3, whereupon the process is repeated.

The foregoing description ignores the fact that during a vertical sweep cycle of the CRT tube, the amplitude of the waveforms A–D, as well as waveforms E and F, will increase. Consequently, so also will the magnitude of the signals applied to the deflection plates 20 and 22 to cause the trace 82, for example, to move upwardly with its length increasing until an entire sector-scan PPI display is produced.

At the same time, and as shown in FIG. 1, the system includes a typical radar system 86 connected to a memory bank 88 which stores the location of a target in rectangular coordinates. The vertical sawtooth waveform on lead 26 is applied to the memory bank 88 as well as the horizontal sync pulses on lead 30 to cause a read out of the memory 88 which may be applied through switch 90 to control grid 18. As the electron beam scans back and forth in the manner shown in FIG. 3, the memory bank 88 will be read out such that when the memory line is reached containing a target signal, the intensity of the electron beam will be caused to increase at the azimuth (i.e., angular position left or right of center) and range (i.e., distance from the apex of the PPI display) corresponding to the location of the target.

While the horizontal scanning rate remains constant, the velocity of the electron beam reduces, as it scans from left to right, nearer the apex of the PPI display than when it is radially displaced from the apex. In the absence of some compensating means, this would tend to make the display produced by the unintensified spot brighter at the bottom near the apex than at the top of the display. In order to compensate for this, horizontal sync pulses on lead 30 are applied to a horizontal retrace blanking circuit 92, and the vertical sync pulses on lead 28 are applied to a vertical retrace blanking circuit 94. The outputs of the two circuits 92 and 94 are combined at a summing point 96 with the vertical sawtooth waveform on lead 26. The result is a waveform such as that indicated by the reference numeral 98 in FIG. 1 comprising a series of pulses of progressively increasing amplitude which can be applied through switch 100 to one of the grids of the CRT tube to vary the intensity of the electron beam. In this manner, it will be appreciated that during the shorter sweeps at the bottom of the PPI display, the intensity of the electron beam is less than at the top of the display. Furthermore, as the electron beam moves upwardly, so also will its intensity to thereby maintain a constant illumination of the PPI display.

Normally, when sine waves displaced 90° with respect to each other are applied to the horizontal and vertical deflection elements of CRT tube, a circle or portion of a circle will appear on the screen with its center at the center of the screen. The center or apex of the PPI display, however, can be moved downwardly to the bottom of the screen to maximize the size of the display through the media of a direct current offset in vertical control 68.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In apparatus for producing a sector-scan PPI radar display on the face of a CRT tube having horizontal and vertical electron beam deflection devices, the combination of means for producing a sine wave whose amplitude increases from a minimum to a maximum as the electron beam scans the face of said CRT tube in one direction, means for dividing said sine wave into separate sine waves of the same increasing amplitude characteristics but displaced in phase with respect to each other, means for producing horizontal sync pulses for said CRT tube, a plurality of gate circuits to which said separate sine waves are applied, means responsive to said horizontal sync pulses for producing enabling pulses for said gate circuits, and means connecting the output of said gate circuits to said horizontal and vertical electron beam deflection devices.

2. The apparatus of claim 1 including means for producing a sawtooth vertical sweep waveform for said CRT tube, means responsive to said horizontal sync pulses for chopping said sawtooth waveform, and filter means for filtering said chopped waveform to produce said sine wave whose amplitude increases from a minimum to a maximum.

3. The apparatus of claim 1 including means for producing vertical sync pulses for said CRT tube, intensity control grid means of said CRT tube, and compensating means connected to said intensity control grid means of said CRT tube responsive to both said vertical and said horizontal sync pulses and said sawtooth vertical sweep waveform for producing a series of pulses adapted to maintain a constant illumination on said face of said CRT tube.

* * * * *